US009158655B2

(12) United States Patent
Wadhwani et al.

(10) Patent No.: US 9,158,655 B2
(45) Date of Patent: Oct. 13, 2015

(54) COMPUTER DEVELOPMENT ASSESSMENT SYSTEM

(71) Applicant: Bank of America Corporation, Charlotte, NC (US)

(72) Inventors: Rajat Wadhwani, Closter, NY (US); Kailash C. Poddar, Coppell, TX (US); Sameer Leekha, Harvana (IN)

(73) Assignee: Bank of America Corporation, Charlotte, NC (US)

( * ) Notice: Subject to any disclaimer, the term of this patent is extended or adjusted under 35 U.S.C. 154(b) by 100 days.

(21) Appl. No.: 13/937,998

(22) Filed: Jul. 9, 2013

(65) Prior Publication Data
US 2014/0331200 A1    Nov. 6, 2014

Related U.S. Application Data

(60) Provisional application No. 61/818,219, filed on May 1, 2013.

(51) Int. Cl.
*G06F 9/44* (2006.01)
*G06F 11/36* (2006.01)

(52) U.S. Cl.
CPC .................................. *G06F 11/3604* (2013.01)

(58) Field of Classification Search
None
See application file for complete search history.

(56) References Cited

U.S. PATENT DOCUMENTS

| 5,293,629 | A * | 3/1994 | Conley et al. ................. 717/154 |
| 7,359,865 | B1 * | 4/2008 | Connor et al. ............... 705/7.28 |
| 7,774,743 | B1 * | 8/2010 | Sanchez et al. ............... 717/103 |
| 8,028,269 | B2 * | 9/2011 | Bhatia et al. .................. 717/103 |
| 8,219,514 | B2 * | 7/2012 | Caldwell et al. ................ 706/47 |
| 8,370,796 | B2 * | 2/2013 | Hahn et al. ..................... 717/106 |
| 8,924,916 | B2 * | 12/2014 | Wadhwani et al. ........... 717/101 |
| 8,984,472 | B1 * | 3/2015 | Wadhwani et al. ........... 717/101 |
| 2003/0187724 | A1 * | 10/2003 | Litwiller et al. ................ 705/11 |
| 2007/0006161 | A1 * | 1/2007 | Kuester et al. ................ 717/126 |
| 2007/0226721 | A1 * | 9/2007 | Laight et al. .................. 717/154 |
| 2009/0119141 | A1 * | 5/2009 | McCalmont et al. ............ 705/7 |
| 2010/0058291 | A1 * | 3/2010 | Hahn et al. ..................... 717/113 |
| 2010/0174672 | A1 * | 7/2010 | Caldwell et al. ................ 706/47 |
| 2010/0218182 | A1 * | 8/2010 | Hahn et al. ..................... 717/178 |
| 2011/0126111 | A1 * | 5/2011 | Gill et al. ....................... 715/736 |
| 2012/0291018 | A1 * | 11/2012 | Peri ............................. 717/126 |
| 2013/0019226 | A1 * | 1/2013 | Hahn et al. ..................... 717/109 |
| 2013/0262643 | A1 * | 10/2013 | Anderson et al. ............. 709/223 |
| 2014/0137071 | A1 * | 5/2014 | Wadhwani et al. ........... 717/101 |
| 2014/0331200 | A1 * | 11/2014 | Wadhwani et al. ........... 717/101 |
| 2015/0082270 | A1 * | 3/2015 | Wadhwani et al. ........... 717/101 |

* cited by examiner

*Primary Examiner* — Don Wong
*Assistant Examiner* — Marina Lee
(74) *Attorney, Agent, or Firm* — Michael A. Springs

(57) ABSTRACT

An apparatus of one embodiment assesses standards compliance during computer development and includes an interface, a memory, and a processor. The interface is operable to receive a selection from a user, the selection including an assessment ruleset to be used for evaluating a computer change. The assessment ruleset includes one or more assessment rules, each assessment rule associated with a condition that determines whether the assessment rule is evaluated. The memory operable to store the assessment ruleset. The processor is operable to determine whether the condition associated with each assessment rule is satisfied, to communicate to the user an evaluation question relating to each assessment rule whose associated condition is satisfied, an answer to the evaluation question indicating an extent to which the computer change complies with the assessment rule, and to determine one or more scores based on the answer to each evaluation question.

20 Claims, 3 Drawing Sheets

Navigational Tools

| Programs | Projects | Applications | Assessments | Searches |

310

320

Program Name: [Select Program ▼]   Chief Accountability
Domain: [Select Domain ▼]          Architect: [    ]
Project Name: [Select Project ▼]   Application Name: [    ]

[SEARCH]

330

| # | Program Name | Lead Assessor | Key Contact | Design Quality | Testing | Deployment Manageability | Security Compliance | ... | |
|---|---|---|---|---|---|---|---|---|---|
| | | | | RULES | | | | | |
| 1 | Website Redesign | ... | ... | 3 | 3 | 3 | 3 | ... | View |
| 2 | ATM Software Upgrade | ... | ... | 1 | 2 | 3 | 0 | ... | View |
| 3 | ... | ... | ... | ... | ... | ... | ... | ... | View |
| 4 | ... | ... | ... | ... | ... | ... | ... | ... | View |
| 5 | ... | ... | ... | ... | ... | ... | ... | ... | View |

*FIG. 3*

COMPUTER DEVELOPMENT ASSESSMENT SYSTEM

RELATED APPLICATIONS

This application claims priority to U.S. Provisional Application Ser. No. 61/818,219 filed May 1, 2013 and entitled "Computer Development Assessment System" which is incorporated herein by reference.

TECHNICAL FIELD OF THE INVENTION

The present invention relates generally to the field of hardware and software development and more particularly to a computer development assessment system.

BACKGROUND OF THE INVENTION

Hardware and software development may involve a design phase, in which plans and other preparations for computer changes are made, and a build phase, in which those plans and preparations are implemented. Companies, business units, or other organizations involved in computer development may have various goals related to these computer changes, such as business goals, technical goals, or other types of goals. The processes and frameworks utilized in computer development may play an important role in improving achievement of or alignment with these goals.

SUMMARY OF THE DISCLOSURE

In accordance with the present invention, certain disadvantages and problems associated with computer development assessments may be reduced or eliminated.

According to one embodiment, an apparatus assesses standards compliance during computer development and includes an interface, a memory, and a processor. The interface is operable to receive a selection from a user, the selection including an assessment ruleset to be used for evaluating a computer change. The assessment ruleset includes one or more assessment rules, each assessment rule associated with a condition that determines whether the assessment rule is evaluated. The memory is operable to store the assessment ruleset. The processor is operable to determine whether the condition associated with each assessment rule is satisfied, to communicate to the user an evaluation question relating to each assessment rule whose associated condition is satisfied, an answer to the evaluation question indicating an extent to which the computer change complies with the assessment rule, and to determine one or more scores based on the answer to each evaluation question.

Certain embodiments of the invention may provide one or more technical advantages. A technical advantage of one embodiment may allow for more effective enforcement of design standards and/or build standards during the software development process. Certain embodiments may also provide a more efficient and cost-effective mechanism for ensuring that standards are met before building and/or operation of the computer change begins. Some embodiments may improve the efficiency of software development and improve the speed-to-market, stability, and overall quality of computer changes. Furthermore, certain embodiments may improve end-to-end program governance and accountability by providing a framework for associating design, build, or operational errors with particular assessment rules and/or particular individuals or organizations. Certain embodiments may also improve communication and collaboration during the development of computer changes. Some embodiments may also improve the user experience when assessing computer changes by storing and managing relationships between a computer change and its associated programs, projects, applications, responsible parties, or other entities. Certain embodiments may also provide improved searchability and visibility by incorporating these relationships into searches and navigation options. Some embodiments may provide improved assessment procedures by enabling more streamlined and user-friendly creation of compliance assessment rulesets that may be used to assess a computer change. Some embodiments may improve assessment efficiency by leveraging general assessment rulesets that may be dynamically tailored to particular computer changes.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3 illustrates an example Graphical User Interface ("GUI") that facilitates user interaction with a computer development assessment system.

DETAILED DESCRIPTION OF THE DRAWINGS

Figure 1:
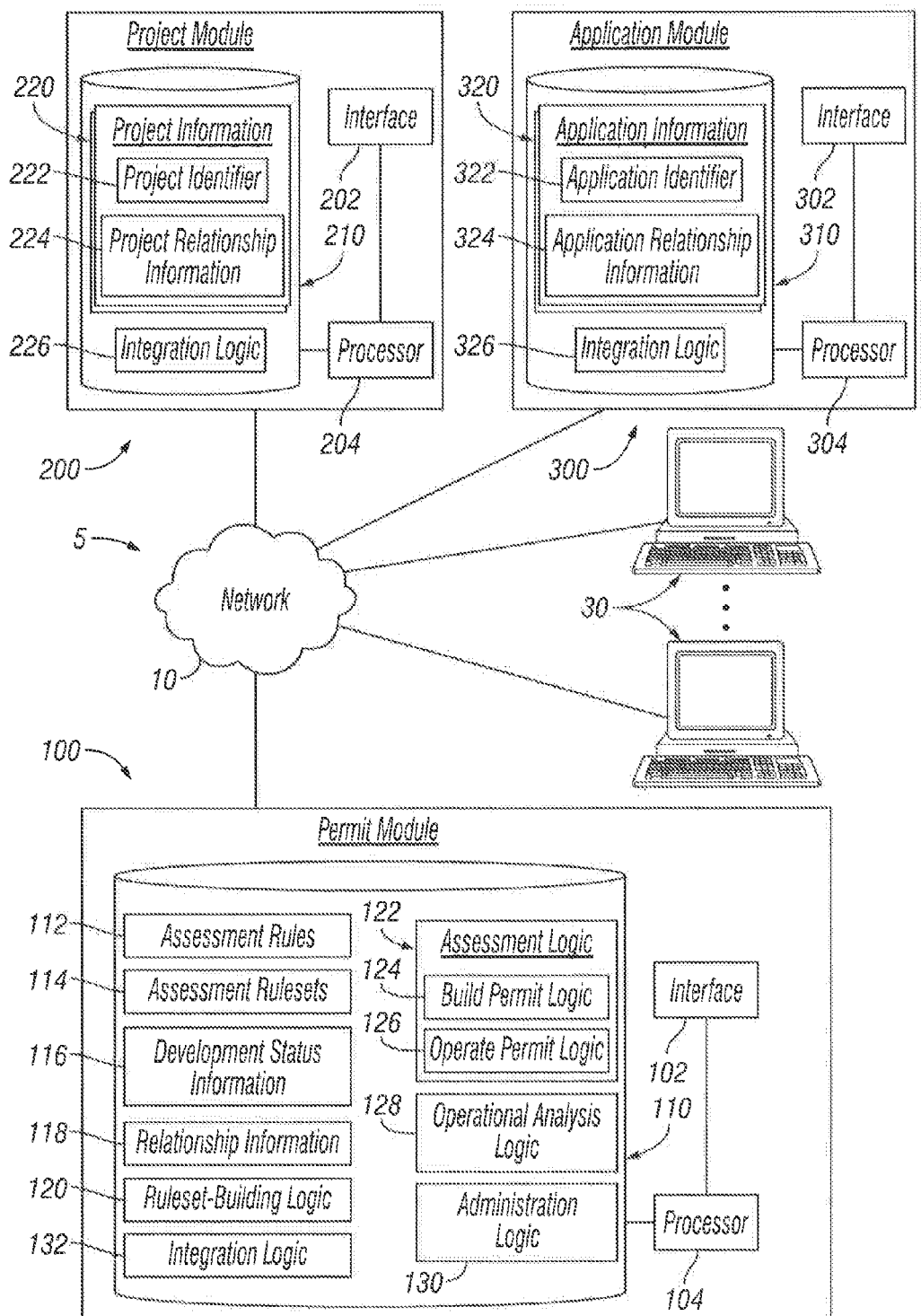
FIG. 1 illustrates an example system that facilitates computer development assessment.
Figure 2:
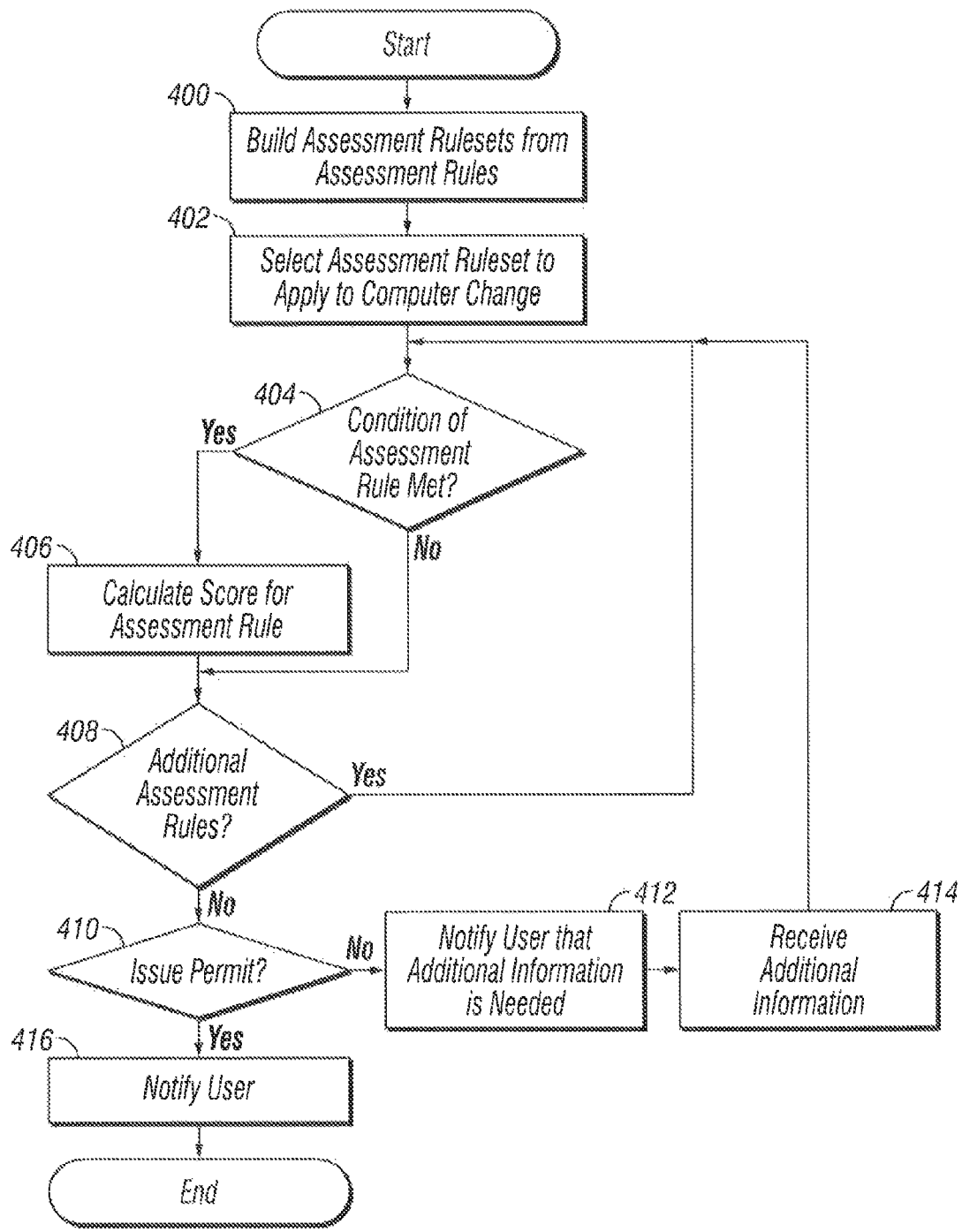
FIG. 2 illustrates an example computer development assessment sequence.

Embodiments of the present invention and its advantages are best understood by referring to FIGS. 1 through 3, like numerals being used for like and corresponding parts of the various drawings.

Certain embodiments facilitate the assessment of standards compliance during the design, implementation, and use of a computer change. Users can build assessment rulesets by selecting one or more rules that will be used to assess compliance. The user may also define a condition for each rule that will dynamically determine whether or not the rule is evaluated during subsequent assessments. When undertaking a particular computer change, a user may select a pre-existing assessment ruleset or generate a new assessment ruleset to use during the assessment of that computer change. During the design phase and/or build phase of the computer change, the computer change may be evaluated against the selected assessment ruleset to determine whether or not to permit building and/or operating of the computer change. During the assessment, each rule whose condition is satisfied may be scored by presenting the user with a question to determine the extent to which the computer change complies with the rule. Rules whose condition is not satisfied may not be evaluated. Performing assessments with conditional rules in this manner may provide improved assessments by dynamically tailoring the assessment to the aspects of a particular rule change. Conditional rules may also provide more efficient assessments by leveraging a single ruleset to assess different types of computer changes that may require different types of assessment.

Certain embodiments may also receive and store information about relationships between the computer change and other aspects of computer development. For example, computer changes may be associated with particular programs, projects, users, applications, or other aspects of computer development. Providing access to and/or storing this relationship information may enable users to efficiently identify the impact of computer changes on other individuals, applications, or areas of a company. This relationship information may also provide improved searchability of computer changes and their associated entities and may enable direct access to associated program, project, application, or user information. Users may also be able to customize their views of the assessment interface or other aspects of the system.

As used herein, the term "computer change" refers to a development project involving the design, implementation, configuration, revision, building, or other change to computer hardware, software, and/or firmware. Such computer development projects include projects that are designed or implemented from scratch, "update" projects that involve modifying and/or adding to a previous project, or any other type of computer development project. Computer changes may include a design phase in which plans for the computer change are developed. The design process may include preparation of various design documents such as, for example, specifications, goals, architecture documents, or any other suitable type of design document. Computer changes may also include a build phase in which previously developed plans are implemented. This process may include procuring, configuring, and otherwise setting up hardware components; writing code, configuration files, or other aspects of software; testing the hardware and/or software; or any suitable task. The separation of design and build phases does not require that the tasks described with respect to a particular phase be mutually exclusive. For example, the design of a computer change may be modified during the building phase.

FIG. 1 illustrates an example system 5 that assesses standards compliance during computer development. System 5 includes permit module 100, which communicates with one or more workstations 30, project module 200, and application module 300 through network 10. Permit module 100 includes processor 104, which is communicatively coupled to network interface 102, and memory 110. Memory 110 includes assessment rules 112, assessment rulesets 114, development status information 116, relationship information 118, ruleset-building logic 120, assessment logic 122 (which includes build permit logic 124 and operate permit logic 126), operational analysis logic 128, administration logic 130, and integration logic 132.

Network 10 represents any suitable network operable to facilitate communication between the components of system 5. Network 10 may include any interconnecting system capable of transmitting audio, video, signals, data, messages, or any combination of the preceding. Network 10 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

Workstations 30 enable one or more users to monitor, administer, or otherwise interact with permit module 100. Workstations 30 may include one or more laptops, personal computers, monitors, display devices, handheld devices, smartphones, servers, user input devices, or other suitable components for enabling user input. During operation of permit module 100, a workstation 30 may allow a user to control the assessment process, monitor the assessment process, track the performance of a computer change after it has been put into operation, administer various modules of system 5 (e.g., permit module 100, project module 200, or application module 300), or perform any other suitable function. For example, workstation 30 may be used to define one or more rules (e.g., assessment rules 112) and to build a ruleset from such rules (e.g., assessment ruleset 114). Workstation 30 may also allow a user to select which assessment ruleset 114 to use when assessing a particular computer change. As another example, workstation 30 may allow a user to view and answer questions posed by permit module 100 during the assessment process to calculate one or more scores that may be used to determine whether or not to permit building and/or operating of a computer change. Workstation 30 may also allow a user to monitor whether the building and/or operating of a computer change has been permitted and to monitor the scores used in that determination, as discussed below in reference to FIG. 3.

In some embodiments, workstation 30 may allow users to monitor errors or other problems associated with a computer change. For example, a user may monitor the status of a computer change that has received an operate permit and is currently in use in order to facilitate the association of an operational error with an underlying assessment rule 112. Errors may also be tracked to one or more individuals responsible for that aspect of the computer change. Enabling such associations may allow users to identify shortcomings in the underlying assessment process, which may facilitate the improvement of the assessment process, or the rules themselves. These associations may also enable a more effective and efficient accountability mechanism. In some embodiments, workstation 30 and permit module 100 may be integrated in the same device.

Permit module 100 represents any suitable components that facilitate software development standards compliance in system 5. Permit module 100 may include a network server, remote server, mainframe, host computer, workstation, web server, personal computer, file server, or any other suitable device operable to communicate with other devices and process data. In some embodiments, permit module 100 may execute any suitable operating system such as IBM's zSeries/ Operating System (z/OS), MS-DOS, PC-DOS, MAC-OS, WINDOWS, UNIX, OpenVMS, Linux or any other appropriate operating systems, including future operating systems. The functions of permit module 100 may be performed by any suitable combination of one or more servers or other components at one or more locations. In the embodiment where the modules are servers, the servers may be public or private servers, and each server may be a virtual or physical server. The server may include one or more servers at the same or at remote locations. Permit module 100 may also include any suitable component that functions as a server. In some embodiments, workstation 30, project module 200, and/or application module 300 may be integrated with permit module 100, or they may operate as part of the same device or devices.

In the illustrated embodiment, permit module 100 includes network interface 102, processor 104, and memory 110.

Network interface 102 represents any suitable device operable to receive information from network 10, transmit information through network 10, perform suitable processing of the information, communicate to other devices, or any combination thereof. For example, network interface 102 may facilitate the building of assessment rulesets 114 by receiving from workstation 30 a preliminary selection of one or more conditional assessment rules (e.g., assessment rules 112)

which may be used to generate an assessment ruleset. As another example, network interface 102 may communicate information regarding a computer change's compliance scores to workstations 30 to facilitate monitoring and administration of standards compliance. Network interface 102 may also receive information from other computer systems, such as project module 200 or application module 300. This information may be used to provide user access to views of projects, programs, applications, users, or other items that are associated with the computer change. This information may also provide improved searchability for computer changes or related items. Network interface 102 represents any port or connection, real or virtual, including any suitable hardware and/or software, including protocol conversion and data processing capabilities, to communicate through a LAN, WAN, or other communication system that allows permit module 100 to exchange information with network 10, workstations 30, other permit modules 100, project module 200, application module 300, or other components of system 5.

Processor 104 communicatively couples to network interface 102 and memory 110, and controls the operation and administration of permit module 100 by processing information received from network interface 102 and memory 110. Processor 104 includes any hardware and/or software that operates to control and process information. For example, processor 104 may execute ruleset-building logic 120 to generate assessment rulesets 114 and associate a ruleset 114 with the computer change. Processor 104 may also execute assessment logic 122 to determine whether to permit building or operating of the computer change. In some embodiments, processor 104 executes operational analysis logic 128 to enable the association of subsequent operational errors with a particular assessment rule 112, a particular user, or another item involved in the assessment process. Processor 104 may also execute administration logic 130 to allow users to administer various aspects of system 5. Processor 104 may be a programmable logic device, a microcontroller, a microprocessor, any suitable processing device, or any suitable combination of the preceding.

Memory 110 stores, either permanently or temporarily, data, operational software, or other information for processor 104, other components of permit module 100, or other components of system 5. Memory 110 includes any one or a combination of volatile or nonvolatile local or remote devices suitable for storing information. For example, memory 110 may include random access memory (RAM), read only memory (ROM), flash memory, magnetic storage devices, optical storage devices, network storage devices, cloud storage devices, solid state devices, or any other suitable information storage device or a combination of these devices. Memory 110 may store information in one or more databases, file systems, tree structures, any other suitable storage system, or any combination thereof. Furthermore, different information stored in memory 110 may use any of these storage systems (e.g., assessment rules 112 may be stored in a relational database while ruleset-building logic 120 is stored in a file system). Moreover, any information stored in memory may be encrypted or unencrypted, compressed or uncompressed, and static or editable. While illustrated as including particular modules, memory 110 may include any suitable information for use in the operation of permit module 100. In the illustrated embodiment, memory 110 includes assessment rules 112, assessment rulesets 114, development status information 116, assessment logic 122 (which includes build permit logic 124 and operate permit logic 126), operational analysis logic 128, administration logic 130, and integration logic 132.

Assessment rules 112 represent any suitable information operable to facilitate the determination of whether a computer change is in compliance with one or more standards. Assessment rules 112 also represent any suitable set of instructions, logic, or code embodied in a computer-readable storage medium and operable to facilitate the determination of whether a computer change is in compliance with one or more standards. Permit module 100 may evaluate status information associated with the computer change against one or more assessment rules 112 to determine whether to issue a build permit or an operation permit. Assessment rules 112 may include design assessment rules or build assessment rules.

Design assessment rules describe requirements or recommendations for the design and/or operation of a computer change. For example, design assessment rules may describe requirements or recommendations relating to strategic alignment, which may include business strategy alignment, technology strategy alignment, or infrastructure strategy alignment; information security compliance; data management; design quality, which may include resiliency, performance, scalability, complexity, or capacity management; resource readiness, which may include human resources and documentation; testing, which may include testing strategy, comprehensiveness, and code management; operational manageability, which may include system and operational documentation as well as control and warranty phase plans; deployment manageability; or monitoring, which may include monitoring comprehensiveness or design.

Build assessment rules describe requirements or recommendations for the building and/or operation of a computer change. For example, build assessment rules may describe requirements or recommendations relating to design quality, monitoring, testing, system and operational documentation, deployment manageability, operational manageability, capacity management, security compliance, people readiness, or control and warranty phase plans. One or more of the build assessment rules may be related to, similar to, or identical to one or more of the design assessment rules. Application of assessment rules 112 during the design, building, and operation of a computer change may increase the efficiency of the software development process and improve the speed-to-market, stability, and overall quality of the computer change. Application of assessment rules 112 may also improve end-to-end program governance and accountability by providing a framework for associating design, build, or operational errors with particular rules and/or particular individuals or organizations.

Certain assessment rules 112 may be conditional assessment rules. Such rules may include both the rule itself as well as one or more conditions that dynamically determine whether the rule is evaluated during the assessment process. For example, if a computer change is part of a pilot project instead of a complete, public rollout of the project, certain pilot-specific assessment rules 112 may be relevant while other assessment rules 112 that do not apply to pilot projects may not be relevant. In this example, certain assessment rules 112 may be associated with conditions that cause the rule to only be applied to pilot-related computer changes, while other assessment rules 112 may be associated with conditions that cause the rule to be ignored when the computer change is pilot-related. When assessing the computer change, the pilot-related assessment rules 112 would be scored while non-pilot-related assessment rules 112 would not be scored. Furthermore, some assessment rules 112 may be specific to design assessments or build assessments, while other rules may apply to design, build, and/or other types of assessments. These types of assessment rules may also be applied based on a condition.

Assessment rulesets 114 define a set of rules that are used to evaluate a computer change. Based on this evaluation, building, operating, or other activity associated with a computer change may be permitted. Assessment rulesets 114 include one or more assessment rules 112. Before beginning the assessment process, a user interacting with workstation 30 may select an assessment rule for a particular computer change. The user may select a preexisting assessment ruleset 114, select and modify an existing assessment ruleset 114, or create a new assessment ruleset 114 from scratch. Assessment rulesets 114 may include one or more conditional assessment rules 112, one or more unconditional assessment rules 112, or any combination thereof. Any of these assessment rules 112 may be a design assessment rule and/or a build assessment rule. Thus a single assessment ruleset 114 may be applied to a design assessment and build assessment (in which case, based on associated conditions, design-specific assessment rules 112 may be applied only during the design assessment and build-specific assessment rules 112 may be applied only during the build assessment), or a different assessment rulesets 114 may be applied during the design and build assessments. In some embodiments, the conditions may be evaluated before the assessment process begins so that a tailored assessment ruleset 114 is generated based on the evaluation of the conditions. Thus, a generic assessment ruleset 114 may be applied to different types of computer changes, or tailored assessment rulesets 114 may be generated upfront based on the aspects of the particular computer change.

Development status information 116 may include design status information, build status information, or operation status information of a computer change. Design status information may indicate the completeness or quality of various aspects of the design (such as, for example, documentation, designer communications, testing plans, or security design compliance), various errors or problems associated with the design (such as, for example, missing documents or resources, design flaws, or design deadlines), or any other information indicating the status of the computer change's design. Design status information may be used to calculate compliance scores that enable permit module 100 to determine whether to issue a build permit for the computer change. Build status information may indicate the completeness or quality of various aspects of the build (such as, for example, source code, operational objectives, testing results, or security compliance), various errors or problems associated with the build (such as, for example, compiling errors, missed build deadlines, operational shortcomings), or any other information indicating the status of the computer change's build. Build status information may be used to calculate compliance scores that enable permit module 100 to determine whether to issue an operate permit for the computer change. Operating status information may indicate the quality or effectiveness of various aspects of the computer change's operation (such as, for example, processing speed, operational objectives, security compliance, user complaints, or monitoring results), various errors or problems associated with the operation of the computer change (such as, for example, runtime errors, user complaints, or other operational shortcomings), or any other information indicating the status of the computer change's operation. Operating status information may enable permit module 100 to associate the computer change's operation status with one or more individuals, groups, organizations, and/or compliances rules.

Relationship information 118 includes any suitable information describing or indicating a relationship between a computer change and one or more other items. Relationship information 118 may also include any suitable information describing or indicating a relationship between these items. These items may include programs, projects, applications, hardware components, users, user groups, types of users, business units, or any suitable item that may be associated with or affected by a computer change. For example, a computer change affecting check-processing software may impact bank teller applications, web applications, and ATM applications, and this computer change may also be part of a software architecture redesign project that encompasses additional software changes. Relationship information may be input by a user, retrieved and/or accessed from a separate computer system, or determined by analyzing other data. For example, when viewing information associated with a computer change on workstation 30, the user may be able to navigate to a view of applications that are impacted by the computer change. To facilitate this view, permit module 100 may access application relationship information 324 from application module 300.

Ruleset-building logic 120 represents any suitable set of instructions, logic, or code embodied in a computer-readable storage medium and operable to facilitate the building of assessment rules 114. Ruleset-building logic 120 may be stored in memory 110 or another memory associated with permit module 100. Ruleset-building logic 120, or portions thereof, may also be embodied in hardware associated with permit module 100 or other components of system 5. Furthermore, the components of ruleset-building logic 120 may be stored in the same or different memories of the same or different permit modules 100. Various components of ruleset-building logic 120 may also be stored in different components of system 5.

In operation, ruleset-building logic 120 solicits user input to define assessment rules 112 and to generate assessment rulesets 114 from these assessment rules 112. The user may select which assessment rules 112 to include in an assessment ruleset 114. Additionally or alternatively, the user may define one or more new assessment rules 112. The user may also define one or more conditions that determine whether or not the assessment rule 112 is evaluated during the assessment process. The user may be prompted to define these conditions explicitly. For example, the user may provide input explicitly indicating that an assessment rule should not be applied to pilot projects. Additionally or alternatively, the user may provide input that is analyzed by ruleset-building logic 120 to determine whether a particular condition is appropriate. For example, the user may be prompted to answer whether a newly defined assessment rule 112 is relevant to pilot projects, and if the user indicates that the rule is not relevant to pilot projects, ruleset-building logic 120 may attach a condition to the assessment rule 112 that causes this rule to be omitted during subsequent assessments of computer changes associated with pilot projects. In embodiments where a tailored assessment ruleset 114 is generated based on an evaluation of the conditions prior to beginning the assessment process, ruleset-building logic 120 may analyze one or more attributes of the computer change to determine whether the conditions of the assessment rules 112 are satisfied, thereby determining which assessment rules 112 to include in the assessment ruleset 114 that will be used to assess the computer change.

Assessment logic 122 represents any suitable set of instructions, logic, or code embodied in a computer-readable storage medium and operable to facilitate the of one or more computer changes. In the illustrated embodiments, assessment logic 122 includes build permit logic 124 and operate permit logic 126. Other embodiments may include different assessment logic in place of or in addition to these components.

Build permit logic 124 represents any suitable set of instructions, logic, or code embodied in a computer-readable storage medium and operable to facilitate the issuance of a build permit for a computer change. Build permit logic 124 may be stored in memory 110 or another memory associated with permit module 100. Build permit logic 124, or portions thereof, may also be embodied in hardware associated with permit module 100 or other components of system 5. Furthermore, the components of build permit logic 124 may be stored in the same or different memories of the same or different permit modules 100. Various components of build permit logic 124 may also be stored in different components of system 5.

In operation, build permit logic 124 evaluates the design status of a computer change and determines whether to permit building of the computer change. To accomplish this, build permit logic 124 may determine a design status of a computer change according to design information received regarding the computer change. The design status may include development status information 116, which may indicate the completeness or quality of various aspects of the computer change's design (such as, for example, documentation, designer communications, testing plans, or security design compliance), various errors or problems associated with the design (such as, for example, missing documents or resources, design flaws, or design deadlines), or any other information indicating the status of the computer change's design. This development status information 116 may be used to calculate one or more design scores, which indicate the extent to which the design of the computer change complies with one or more assessment rules 112.

Design scores may be determined automatically by build permit logic 124, build permit logic 124 may prompt the user to provide the design scores, or a combination of user input and automatic calculations may be utilized. For example, build permit logic 124 may calculate the design scores by communicating one or more design evaluation questions to the user. Each design evaluation question may be associated with an assessment rule 112. For example, when calculating a security compliance assessment rule 112, build permit logic 124 may prompt the user to answer one or more questions evaluating the extent to which the computer change complies with a security standard. The user may provide an answer that explicitly includes the design score for this assessment rule 112, or build permit logic 124 may analyze the answer to the question to determine this design score.

In embodiments where the assessment ruleset 114 being applied by build permit logic 124 includes one or more conditional assessment rules 112, build permit logic 124 may evaluate whether a condition is satisfied to determine whether an assessment rule 112 is scored. For each conditional design assessment rule 112, build permit logic 124 may determine whether the one or more conditions associated with the rule are satisfied. If the one or more conditions are satisfied, build permit logic 124 may communicate a design evaluation question regarding the associated assessment rule 112 to the user. The user may then provide an answer to the design evaluation question that indicates the extent to which the computer change complies with the design assessment rule. This process may be repeated for each assessment rule 112, or the user may choose to score particular design assessment rules 112 at a time of his or her choosing.

In a particular embodiment, compliance scores range from 0 to 3, a score of 0 indicating that the rule is not applicable to the computer change, a score of 1 indicating that the aspect of the computer change associated with the rule is either not in place or fails an evaluation due to having too many exceptions to be effective, a score of 2 indicating that the aspect of the computer change associated with the rule is in place and effective with minor gaps, and a score of 3 indicating that the aspect of the computer change associated with the rule is in place and passes the evaluation as effective. However, numerous suitable scoring metrics are possible. For example, other embodiments may utilize a 0-10 scale, a pass-fail scale, a color-coded scale, any other scale suitable for compliance scoring, or any combination thereof. One or more scores may be presented to a user as a "heat map," which may indicate the status of the assessment of one or more assessment rules 112.

In some embodiments, each design assessment rule has a rule type (such as, for example, "non-negotiable," "critical," or "recommended"), which indicates the impact on the build permit determination of the compliance score associated with that rule. For example, a rule type of "non-negotiable" may indicate that a low design compliance score for that design assessment rule results in automatic denial of a build permit for the computer change, while a rule type of "recommended" may indicate that a low design compliance score for that design assessment rule will not automatically result in denial of a build permit (though it may result in one or more notifications related to the compliance score). As a particular example, a security assessment rule may have a "non-negotiable" rule type, indicating that a low compliance score for the security assessment rule would result in automatic denial of the build permit.

Based at least in part on the design compliance scores, build permit logic 124 determines whether to permit building of the computer change. In some embodiments, build permit logic 124 also communicates a permit notification to one or more users indicating that building of the computer change is permitted or that additional information or action is needed before building of the computer change is permitted. This mechanism of evaluating and approving the build of a computer change may increase the efficiency of the software development process and improve the speed-to-market, stability, and overall quality of the computer change since aspects of the computer changes that are important to swiftly, efficiently, and effectively developing software may be verified before building can begin.

Operate permit logic 126 represents any suitable set of instructions, logic, or code embodied in a computer-readable storage medium and operable to facilitate the issuance of an operate permit for a computer change. Operate permit logic 126 may be stored in memory 110 or another memory associated with permit module 100. Operate permit logic 126, or portions thereof, may also be embodied in hardware associated with permit module 100 or other components of system 5. Furthermore, the components of operate permit logic 126 may be stored in the same or different memories of the same or different permit modules 100. Various components of operate permit logic 126 may also be stored in different components of system 5.

In operation, operate permit logic 126 evaluates the build status of a computer change and determines whether to permit operation of the computer change. To accomplish this, operate permit logic 126 determines a build status of a computer change according to build information received regarding the computer change. The build status includes build status information, which may indicate the completeness or quality of various aspects of the build (such as, for example, source code, operational objectives, testing results, or security compliance), various errors or problems associated with the build (such as, for example, compiling errors, missed build deadlines, operational shortcomings), or any other information indicating the status of the computer change's build. This build status is used to calculate one or more build compliance scores, which indicate the extent to which the build status of the computer change complies with one or more build assessment rules.

Build scores may be determined automatically by operate permit logic 124, operate permit logic 124 may prompt the user to provide the build scores, or a combination of user input and automatic calculations may be utilized. For example, operate permit logic 124 may calculate the build scores by communicating one or more build evaluation questions to the user. Each build evaluation question may be associated with an assessment rule 112. For example, when calculating a deployment manageability assessment rule 112, operate permit logic 124 may prompt the user to answer one or more questions evaluating the extent to which the computer change complies with a deployment manageability requirement. The user may provide an answer that explicitly includes the build score for this assessment rule 112, or operate permit logic 124 may analyze the answer to the question to determine this build score. This process may be repeated for each assessment rule 112, or the user may choose to score particular build assessment rules 112 at a time of his or her choosing.

In embodiments where the assessment ruleset 114 being applied by operate permit logic 126 includes one or more conditional assessment rules 112, operate permit logic 126 may evaluate whether a condition is satisfied to determine whether an assessment rule 112 is scored. For each conditional build assessment rule 112, operate permit logic 126 may determine whether the one or more conditions associated with the rule are satisfied. If the one or more conditions are satisfied, operate permit logic 126 may communicate a build evaluation question regarding the associated assessment rule 112 to the user. The user may then provide an answer to the build evaluation question that indicates the extent to which the computer change complies with the build assessment rule 112.

In some embodiments, each build assessment rule has a rule type (such as, for example, "non-negotiable," "critical," or "recommended"), which indicates the impact on the build permit determination of the compliance score associated with that rule. For example, a rule type of "non-negotiable" may indicate that a low build compliance score for that build assessment rule results in automatic denial of an operate permit for the computer change, while a rule type of "recommended" may indicate that a low build compliance score for that build assessment rule will not automatically result in denial of an operate permit (though it may result in one or more notifications related to the compliance score). As a particular example, a build testing rule may have a "non-negotiable" rule type, indicating that a low compliance score for the security assessment rule would result in automatic denial of the operate permit. As another example, a people readiness rule may have a "critical" rule type, indicating that a low compliance score for that rule would require review and approval by a one or more individuals before an operate permit is issued, but will not automatically result in permit denial.

Based at least in part on the build compliance scores, operate permit logic 126 determines whether to permit operating of the computer change. In some embodiments, operate permit logic 126 also communicates a permit notification to one or more users indicating that the computer change can be put into production or that additional information or action is needed before the computer change can be put into production. This mechanism of evaluating and approving the build of a computer change before operating can begin may allow for more effective enforcement of build standards during the software development process. Issuing operate permits for computer changes in this manner may also provide a more efficient and cost-effective mechanism for ensuring that certain standards are met before the computer change can be put into production.

Operational analysis logic 128 represents any suitable set of instructions, logic, or code embodied in a computer-readable storage medium and operable to facilitate the analysis of operation statuses of computer changes. Operational analysis logic 128 may be stored in memory 110 or another memory associated with permit module 100. Operational analysis logic 128, or portions thereof, may also be embodied in hardware associated with permit module 100 or other components of system 5. Furthermore, the components of operational analysis logic 128 may be stored in the same or different memories of the same or different permit modules 100. Various components of operational analysis logic 128 may also be stored in different components of system 5.

In operation, operational analysis logic 128 evaluates the operating status of the computer change and associates the operating status with one or more assessment rules. For example, operational analysis logic 128 may identify an error associated with the operation of the computer change and associate the error with an assessment rule. As one example, operational analysis logic 128 may identify a runtime error associated with a software that was issued an operate permit. Operational analysis logic 128 may then identify a build testing assessment rule associated with the aspect of the computer change that produced the error and, optionally, communicate a notification of the error and its associated assessment rule to one or more users. As another example, operational analysis logic 128 may identify a security failure while monitoring the operation of the computer change. Operational analysis logic 128 may then identify one or more security assessment rules associated with the security failure and, optionally, communicate a notification of the security failure and its associated security assessment rule or rules to one or more users. Operational analysis logic 128 may also associate an error with one or more individuals, groups, or organizations who were responsible for that aspect of the computer change or who were responsible for evaluating the computer change against the implicated assessment rule. Identifying errors and associating them with assessment rules or one or more entities may allow for improved accountability in the software development process since the assessment rule and/or a particular person, group, or organization that may be at least partially responsible for the error can be effectively and efficiently identified. Identifying errors and associating them with assessment rules or one or more entities may also provide improved end-to-end program governance since oversight of the software development process can be managed through an integrated framework.

Administration logic 130 represents any suitable set of instructions, logic, or code embodied in a computer-readable storage medium and operable to facilitate the administration of permit module 100. Administration logic 130 may be stored in memory 110 or another memory associated with permit module 100. Administration logic 130, or portions thereof, may also be embodied in hardware associated with permit module 100 or other components of system 5. Furthermore, the components of administration logic 130 may be stored in the same or different memories of the same or different permit modules 100. Various components of administration logic 130 may also be stored in different components of system 5.

In operation, administration logic 130 enables one or more administrators to view, add, delete, or modify one or more assessment rules 112, conditions associated with an assessment rule 112, development status information 116, relationship information 118, compliance scores, build permits, or operate permits, or any suitable information. For example, administration logic 130 may operate to present a GUI on a user's display (such as, for example, workstation 30) with which the user can interact to perform one or more of the tasks described above. Such an example is described in greater detail below in reference to FIG. 3. In presenting a GUI, administration logic 130 may also utilize images, text, or other assets. Administration logic 130 may be stored in memory 110 or another memory associated with permit module 100. Administration logic 130, or portions thereof, may also be embodied in hardware associated with permit module 100 or other components of system 5. Furthermore, the components of administration logic 130 may be stored in the same or different memories of the same or different permit modules 100. Various components of administration logic 130 may also be stored in different components of system 5.

Integration logic 132 represents any suitable set of instructions, logic, or code embodied in a computer-readable storage medium and operable to facilitate the integration of information from one or more other modules of system 5. Integration logic 132 may be stored in memory 110 or another memory associated with permit module 100. Integration logic 132, or portions thereof, may also be embodied in hardware associated with permit module 100 or other components of system 5. Furthermore, the components of integration logic 132 may be stored in the same or different memories of the same or different permit modules 100. Various components of integration logic 132 may also be stored in different components of system 5.

In operation, integration logic 132 accesses information associated with one or more modules associated with system 5. For example, integration logic 132 may access information stored by project module 200 or application module 300. Integration logic 132 may access this information at the request of a user, or it may access the information automatically. In some embodiments, integration logic 132 may also store this information once it is accessed. For example, integration logic 132 may access project information 220 by communicating with project module 200. Integration logic 132 may then store portions of project information 220 in memory 110 (e.g., portions of project identifiers 222 and project relationship information 224 may be stored as relationship information 118). Analogous processing may be performed with respect to application module 300 or another component of system 5. Integrating information from separate systems may provide users with a unified context and view of the assessment process and/or other related items. This integration may provide an improved assessment process by providing visibility of other aspects of a company that may be impacted by the computer change. This integration may also provide improved design processes by providing an integrated framework that is capable of showing and managing the relationship between design processes (e.g., architecture management), implementation processes (e.g., coding and testing), and assessment processes.

Project module 200 represents any suitable components that maintain information and perform processing relating to projects. Project module 200 may include a network server, remote server, mainframe, host computer, workstation, web server, personal computer, file server, or any other suitable device operable to communicate with other devices and process data. In some embodiments, project module 200 may execute any suitable operating system such as IBM's zSeries/Operating System (z/OS), MS-DOS, PC-DOS, MAC-OS, WINDOWS, UNIX, OpenVMS, Linux or any other appropriate operating systems, including future operating systems. The functions of project module 200 may be performed by any suitable combination of one or more servers or other components at one or more locations. In the embodiment where the modules are servers, the servers may be public or private servers, and each server may be a virtual or physical server. The server may include one or more servers at the same or at remote locations. Project module 200 may also include any suitable component that functions as a server. In some embodiments, workstation 30, permit module 100, and/or application module 300 may be integrated with project module 200, or they may operate as part of the same device or devices.

In the illustrated embodiment, project module 200 includes network interface 202, processor 204, and memory 210.

Network interface 202 represents any suitable device operable to receive information from network 10, transmit information through network 10, perform suitable processing of the information, communicate to other devices, or any combination thereof. For example, network interface 202 may facilitate the communication of one or more portions of project information 220 to permit module 100. Network interface 202 may also receive information from other computer systems, such as permit module 100 or application module 300. Network interface 202 represents any port or connection, real or virtual, including any suitable hardware and/or software, including protocol conversion and data processing capabilities, to communicate through a LAN, WAN, or other communication system that allows project module 200 to exchange information with network 10, workstations 30, permit module 100, other project modules 200, application module 300, or other components of system 5.

Processor 204 communicatively couples to network interface 202 and memory 210, and controls the operation and administration of project module 200 by processing information received from network interface 202 and memory 210. Processor 204 includes any hardware and/or software that operates to control and process information. For example, processor 204 may execute integration logic 226 to facilitate the communication or project information 220 to permit module 100. Processor 204 may be a programmable logic device, a microcontroller, a microprocessor, any suitable processing device, or any suitable combination of the preceding.

Memory 210 stores, either permanently or temporarily, data, operational software, or other information for processor 204, other components of project module 200, or other components of system 5. Memory 210 may include any component discussed above regarding memory 110. Memory 210 may store information in one or more databases, file systems, tree structures, any other suitable storage system, or any combination thereof. Furthermore, different information stored in memory 210 may use different types of storage systems. Moreover, any information stored in memory may be encrypted or unencrypted, compressed or uncompressed, and static or editable. While illustrated as including particular modules, memory 210 may include any suitable information for use in the operation of project module 200. In the illustrated embodiment, memory 210 includes project information 220 and integration logic 226.

Project information 220 represents any suitable information associated with a project. Projects may be any type of initiative undertaken by an individual, group, or organization to implement a change. Projects may encompass one or more computer change and/or one or more additional types of changes. For example, an ATM overhaul project may involve computer hardware changes, computer software changes, advertising changes, personnel changes, organizational changes, or any other suitable change involving an aspect of the project. Project information 220 may enable improved development processes by providing users with access to useful information about the context of a computer change. In the illustrated embodiment, project information 220 includes project identifier 222 and project relationship information 224.

Project identifier 222 represents any suitable information for identifying projects. For example, project identifier 222 may be a unique set of numbers, letters, symbols, and/or other characters that identify a particular project. Such information may be used to enable searching of projects or to provide a mechanism for identifying, storing, or otherwise managing relationships between projects and other items.

Project relationship information 224 represents any suitable information that facilitates managing relationships between projects and other items. For example, project relationship information 224 may indicate relationships between projects and computer changes, between projects and applications, between different projects, or any other suitable relationship. This information may be stored in any suitable format (e.g., in a database, file system, or other resource). Project relationship information 224 may also be implicit in other information. For example, a project identifier 222 may include data that indicates the project's relationship with another item.

Integration logic 226 represents any suitable set of instructions, logic, or code embodied in a computer-readable storage medium and operable to facilitate the integration of information from one or more other modules of system 5. Integration logic 226 may be stored in memory 210 or another memory associated with project module 200. Integration logic 226, or portions thereof, may also be embodied in hardware associated with project module 200 or other components of system 5. Furthermore, the components of integration logic 226 may be stored in the same or different memories of the same or different project modules 200. Various components of integration logic 226 may also be stored in different components of system 5.

In operation, integration logic 226 communicates information associated with one or more modules associated with system 5. For example, integration logic 226 may communicate one or more portions of project information 220 to permit module 100 or another computer of system 5. Integration logic 226 may communicate this information at the request of a user, or it may communicate the information automatically. Integrating information from separate systems may provide users with a unified view of the assessment process and/or other related items. This integration may provide an improved assessment process by providing efficient access to project information that is related to a particular assessment.

Application module 300 represents any suitable components that maintain information and perform processing relating to applications. Application module 300 may include a network server, remote server, mainframe, host computer, workstation, web server, personal computer, file server, or any other suitable device operable to communicate with other devices and process data. In some embodiments, application module 300 may execute any suitable operating system such as IBM's zSeries/Operating System (z/OS), MS-DOS, PC-DOS, MAC-OS, WINDOWS, UNIX, OpenVMS, Linux or any other appropriate operating systems, including future operating systems. The functions of application module 300 may be performed by any suitable combination of one or more servers or other components at one or more locations. In the embodiment where the modules are servers, the servers may be public or private servers, and each server may be a virtual or physical server. The server may include one or more servers at the same or at remote locations. Application module 300 may also include any suitable component that functions as a server. In some embodiments, workstation 30, permit module 100, and/or project module 200 may be integrated with application module 300, or they may operate as part of the same device or devices.

In the illustrated embodiment, application module 300 includes network interface 302, processor 304, and memory 310.

Network interface 302 represents any suitable device operable to receive information from network 10, transmit information through network 10, perform suitable processing of the information, communicate to other devices, or any combination thereof. For example, network interface 302 may facilitate the communication of one or more portions of project information 220 to permit module 100. Network interface 302 may also receive information from other computer systems, such as permit module 100 or project module 200. Network interface 302 represents any port or connection, real or virtual, including any suitable hardware and/or software, including protocol conversion and data processing capabilities, to communicate through a LAN, WAN, or other communication system that allows application module 300 to exchange information with network 10, workstations 30, permit module 100, project module 200, other application modules 300, or other components of system 5.

Processor 304 communicatively couples to network interface 302 and memory 310, and controls the operation and administration of application module 300 by processing information received from network interface 302 and memory 310. Processor 304 includes any hardware and/or software that operates to control and process information. For example, processor 304 may execute integration logic 326 to facilitate the communication or application information 320 to permit module 100. Processor 304 may be a programmable logic device, a microcontroller, a microprocessor, any suitable processing device, or any suitable combination of the preceding.

Memory 310 stores, either permanently or temporarily, data, operational software, or other information for processor 304, other components of application module 300, or other components of system 5. Memory 310 may include any component discussed above regarding memory 110. Memory 310 may store information in one or more databases, file systems, tree structures, any other suitable storage system, or any combination thereof. Furthermore, different information stored in memory 310 may use different types of storage systems. Moreover, any information stored in memory may be encrypted or unencrypted, compressed or uncompressed, and static or editable. While illustrated as including particular modules, memory 310 may include any suitable information for use in the operation of application module 300. In the illustrated embodiment, memory 310 includes application information 320 and integration logic 326.

Application information 320 represents any suitable information associated with an application. An application may be a software program that operates to perform a computing task. Applications may also include configuration files, hardware, or other associated components. A computer change may impact multiple applications, and a single application may be associated with multiple computer changes. For example, a check-depositing application may be affected by numerous computer changes, and each of those computer changes may also affect other applications beyond the check-depositing application. Application information 320 may enable improved development processes by providing users with access to useful information about the context of a computer change. In the illustrated embodiment, application information 320 includes application identifier 322 and project relationship information 324.

Application identifier 322 represents any suitable information for identifying an application. For example, application identifier 322 may be a unique set of numbers, letters, symbols, and/or other characters that identify a particular application. Such information may be used to enable searching of applications or to provide a mechanism for identifying, storing, or otherwise managing relationships between applications and other items.

Application relationship information 324 represents any suitable information that facilitates managing relationships between applications and other items. For example, application relationship information 324 may indicate relationships between applications and computer changes, between projects and applications, between different applications, or any other suitable relationship. This information may be stored in any suitable format (e.g., in a database, file system, or other resource). Application relationship information 324 may also be implicit in other information. For example, an application identifier 322 may include data that indicates the application's relationship with another item.

Integration logic 326 represents any suitable set of instructions, logic, or code embodied in a computer-readable storage medium and operable to facilitate the integration of information from one or more other modules of system 5. Integration logic 326 may be stored in memory 310 or another memory associated with application module 300. Integration logic 326, or portions thereof, may also be embodied in hardware associated with application module 300 or other components of system 5. Furthermore, the components of integration logic 326 may be stored in the same or different memories of the same or different application modules 300. Various components of integration logic 326 may also be stored in different components of system 5.

In operation, integration logic 326 communicates information associated with one or more modules associated with system 5. For example, integration logic 326 may communicate one or more portions of application information 320 to permit module 100 or another computer of system 5. Integration logic 326 may communicate this information at the request of a user, or it may communicate the information automatically. Integrating information from separate systems may provide users with a unified view of the assessment process and/or other related items. This integration may provide an improved assessment process by providing efficient access to application information that is related to a particular assessment.

In an exemplary embodiment of operation, a user provides one or more preliminary inputs to permit module 100 via workstation 30, each preliminary input defining a condition of an assessment rule 112, which may be stored by memory 110. Permit module 100 then generates an assessment ruleset 114 including one or more assessment rules 112. A user then provides a selection of an assessment ruleset 114 to be used during assessment of a computer change. Permit module 100 analyzes one or more aspects of the computer change to determine whether the conditions associated with the assessment rules 112 of the selected assessment ruleset 114 are satisfied. Permit module 100 communicates to the user an evaluation question for each assessment rule 112 whose condition was satisfied. The user provides an answer to the questions via a workstation 30, each answer indicating the extent to which the computer change complies with the assessment rule 112 that was associated with the question, and permit module 100 determines one or more design scores based on the answers. Different users may answer different questions. Based on these design scores, permit module 100 may determine whether to permit building of the computer change. If building is permitted, a notification may be communicated to one or more users. If building is not permitted, permit module 100 may notify one or more users that additional information or action is required before building can be permitted.

After building of the computer change begins, permit module 100 may determine whether to permit operation of computer change. A build-specific assessment ruleset 114 may be selected by the user, or permit module 100 may utilize the same assessment ruleset 114 that was used during the design phase (in which case build-related conditions associated with one or more assessment rules 112 may cause a partially or completely different set of assessment rules 112 to be applied). Permit module 100 may determine one or more build scores in an analogous manner to its determination of the design scores. Based on these build scores, permit module 100 may determine whether to permit operation of the computer change, in which case a notification that operating of the computer change has been permitted may be communicated to one or more users. If operating is not permitted, permit module 100 may notify one or more users that additional information or action is required before operating can be permitted.

In some embodiments, users of workstations 30 may monitor the status of the software development. For example, a user of workstation 30 may communicate a request for the design or build scores associated with one or more computer changes. Permit module 100 may execute administration logic 130 to facilitate the communication of a score response including the compliance scores to the user. In certain embodiments, once operating of the computer change begins, permit module 100 executes operational analysis logic 128 to monitor the operational status of the computer change and to associate any operational errors with one or more assessment rules and/or one or more individuals, groups, or organizations.

A component of system 5 may include an interface, logic, memory, and/or other suitable element. An interface receives input, sends output, processes the input and/or output, and/or performs other suitable operations. An interface may comprise hardware and/or software. Logic performs the operation of the component. For example, logic executes instructions to generate output from input. Logic may include hardware, software, and/or other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 5 without departing from the scope of the invention. For example, system 5 may implement computer assessment procedures different from or in addition to those described herein. As another example, multiple permit modules 100 may operate in parallel to facilitate standards compliance. As yet another example, assessment rules 112 may be configurable by a user of permit module 100 or workstation 30, which may facilitate the modification of existing rules, deletion of existing rules, or insertion of additional rules. System 5 may include any number of networks 10, workstations 30, permit modules 100, project modules 200, and application modules 300. Any suitable logic may perform the functions of system 5 and the components within system 5.

FIG. 2 is a diagram that illustrates an example computer development assessment sequence of permit module 100.

At step 400, permit module 100 builds one or more assessment rulesets 114 from assessment rules 112. A user may select preexisting assessment rules 112, edit assessment rules 112, or create new assessment rules 112. The user may also add one or more conditions to any of the assessment rules 112 that may determine, based on one or more aspects of the computer change, whether or not the assessment rule 112 is used to evaluate a particular computer change. For example, the user may indicate that a particular assessment ruleset 112 should only be applied to pilot projects.

At step 402, a user selects an assessment ruleset 114 that will be used to assess the computer change. The user may explicitly select an assessment ruleset 114, or the user may provide input that is analyzed by permit module 100 to determine which assessment ruleset 114 to apply. For example, the user may indicate that the computer change is part of a particular pilot project, and permit module 100 may select an assessment ruleset 114 that is tailored for the assessment of pilot projects.

At step 404, permit module 100 evaluates a condition of one or more assessment rules 112. In some embodiments, the condition may be evaluated during the assessment process. For example, a generic assessment ruleset 114 may be applied to the computer change, and during the assessment process, the conditions of the assessment rules 112 may be evaluated to determine whether or not to score that particular assessment rule 112. In other embodiments, the conditions may be evaluated at the time the assessment ruleset 114 is selected. For example, when selecting the assessment ruleset 114 during step 402, the user may indicate that a computer change is related to a pilot project. Permit module 100 may then use a generic assessment ruleset 114 to build a tailored assessment ruleset 114 by excluding rules that do not apply to pilot projects. In such cases, the conditions of the assessment rules 112 may not need to be subsequently evaluated as the user is performing the assessment because the appropriate set of assessment rules 112 may already be assembled in the assessment ruleset 114 that is being used. Evaluating conditions of an assessment rule 112 to determine whether it is used during the assessment may provide a more efficient assessment process by reducing the amount of work required to perform assessments. Leveraging common assessment rules 112 may provide a more streamlined and uniform assessment process. If the condition is satisfied, the sequence proceeds to step 406. If the condition is not satisfied, the sequence proceeds to step 408.

At step 406, a score is calculated for the assessment rule 112. This score may be a design score, a build score, or any suitable type of score. The score may be calculated automatically, or it may be based on input from a user. For example, permit module 100 may communicate an evaluation question to the user, and the user's answer may indicate an extent to which the computer complies with the assessment rule 112. As a specific example, permit module 100 may ask the user to provide input indicating whether the computer change has passed one or more testing requirements. Alternatively, permit module 100 may access testing data stored by another component of system 5 to automatically determine whether the computer change has satisfied the testing requirements. In some embodiments, the assessment rule 112 may have a rule type (such as, for example, "non-negotiable," "critical," or "recommended"), which indicates the impact on the permit determination of the score associated with that assessment rule 112. For example, a rule type of "non-negotiable" may indicate that a low score for that design assessment rule results in automatic denial of a permit (e.g., a build permit or an operate permit) for the computer change, while a rule type of "recommended" may indicate that a low score for that assessment rule 112 will not automatically result in denial of a permit (though it may result in one or more notifications related to the compliance score).

At step 408, permit module 100 determines whether additional assessment rules 112 must be scored (i.e. whether the assessment process is complete). If additional assessment rules 112 must be scored, the sequence may proceed to step 404 and perform the subsequent steps for the new assessment rule 112. In other embodiments, the sequence may proceed to step 406 rather than step 404. For example, in embodiments where the conditions are evaluated prior to the assessment process, evaluating the conditions during the assessment process may not be necessary. If no additional assessment rules 112 remain, the sequence proceeds to step 410.

At step 410, permit module 100 determines whether the scores warrant issuance of a permit (e.g., a build permit or an operate permit). This determination is based at least in part on the scores (e.g., a design scores or build scores), and, in some embodiments, the rule type of the assessment rule 112 that associated with a score. For example, in some instances, permit module 100 may determine that a build permit should be issued because the design scores indicate that all design assessment rules 112 have been satisfied. If permit module 100 does determine that a permit is warranted, the sequence proceeds to step 416. However, in some cases, permit module may determine that a permit is not warranted. This may occur if, for example, an assessment rule that has a "non-negotiable" type has a corresponding compliance score indicating that the rule has not been complied with. In such cases, the sequence proceeds to step 412.

At step 412, permit module 100 notifies a user that additional information is needed. This notification may involve sending an email to the user, sending a text message to the user, notifying the user via an application that runs on workstation 30 or another device, or any other suitable form of notification. The notification may identify the assessment rule or rules 112 that resulted in denial of the permit, provide information about the computer change, request further information from the user, request further action by the user, and/or provide any information necessary to inform the user about the issue.

At step 414, permit module 100 receives additional information following the request by permit module 100 to provide additional information. If the permit at issue is a build permit, this information may include design document updates, testing plan updates, user input overriding the denial of the build permit, or any other information regarding the design of the computer change. If the permit at issue is an operate permit, this information may include code updates or additions, bug fixes, additional testing, user input overriding the denial of the operate permit, or any other information regarding the build of the computer change. After the additional information has been received, permit module 100 may return to step 404 (or, in some embodiments, 406) and reevaluate the scores. In some embodiments, an administrator may be able to bypass this recalculation and proceed directly to step 416.

At step 416, permit module 100 communicates a notification of a permit for the computer change. A build permit indicates that building of the computer change can proceed. Evaluating and approving the design of a computer change in this manner may increase the efficiency of the software development process and improve the speed-to-market, stability, and overall quality of the computer change since aspects of the computer changes that are important to swiftly, efficiently, and effectively developing software may be verified before building can begin. Once building of the computer change commences, permit module 100 may proceed to step 228. An operate permit indicates that the build of the computer change can be put into production. Evaluating and approving the build of a computer change in this manner may increase the efficiency of the software development process and improve the speed-to-market, stability, and overall quality of the computer change since aspects of the computer changes that are important to providing accurate, stable software that aligns with the goals of the company developing and/or using it can be verified efficiently and effectively before the computer change is put into production. End-to-end governance and accountability may also be improved since downstream aspects of the software development can be associated with earlier aspects of the development. Furthermore, this mechanism of evaluating and approving the build of a computer change before operating can begin may allow for more effective enforcement of build standards during the software development process. Issuing operate permits for computer changes in this manner may also provide a more efficient and cost-effective mechanism for ensuring that certain standards are met before the computer change can be put into production.

Various embodiments may perform some, all, or none of the steps described above. For example, certain embodiments may omit steps 400, 404, 412, 414, and/or 416 under certain conditions, or they may omit these steps entirely. Furthermore, certain embodiments may perform these steps in different orders or in parallel. Moreover, one or more steps may be repeated. For example, this sequence may be performed once during the design phase of the computer change and then performed again during the build phase of the computer change. While discussed as permit module 100 performing these steps, any suitable component of system 5 may perform one or more steps of the method.

FIG. 3 illustrates an example GUI 500, which facilitates administrating, monitoring, and otherwise interacting with permit module 100. GUI 500 may be presented on a display of one or more workstations 30 following execution of assessment logic 122, administration logic 130, or any other suitable logic. GUIs 500 are generally operable to tailor and filter data entered by and presented to the user. GUI 500 may provide the user with an efficient and user-friendly presentation of information and may comprise a plurality of displays having interactive fields, pull-down lists, and buttons operated by the user. Different embodiments of GUI 500 may utilize common components, information, or computer code. GUIs 500 may include multiple levels of abstraction including groupings and boundaries. It should be understood that the term GUI may be used in the singular or in the plural to describe one or more GUIs 500 and each of the displays of a particular GUI 500. Moreover, one or more aspects of GUI 500 may be customized based on the identity of the user, the user group of the user, input from the user, or any suitable parameter. For example, users may have customized search options, customized window layouts, or any other suitable customization.

The GUI 500 depicted in FIG. 3 facilitates review and input by a user related to one or more computer changes. GUI 500 includes navigational tools area 510, search area 520, and computer change information area 530.

Navigational tools area 510 facilitates navigation through various views of information related to the computer changes. For example, navigational tools area 510 may include links, tabs, buttons, or any other suitable component to enable a user to navigate to a different view. Navigational tools 310 may provide tabs that allow the user to view different categories of information. For example, different tabs may provide views of project information, assessment information, application information, and other types of information. Navigational tools 310 may therefore provide a unified hub that allows a user to access different categories of information from a single workspace.

Search area 520 facilitates searching for one or more computer changes. As shown in FIG. 3, search area 520 may include components that enable searching by program name, domain, project, users (e.g., a chief accountability architect), affected applications, or any suitable search criteria. A program name may be the name of a computer change or group of computer changes. A domain may be an organization, grouping, characterization, or other category associated with one or more computer changes. A chief accountability architect is an individual, group, or other entity associated with a computer change and accountable for one or more assessment rules 112 that are applied to that computer change. In various embodiments, the search components may be drop-down menus, lists, hyperlinks, buttons, text boxes, or any other suitable component for facilitating searching. As one example of user interaction with search area 520, a user may interact with a "program name" drop-down menu, which then displays a list of computer changes, and the user may then select the desired entry and interact with the "search" button to search for one or more computer changes. Furthermore, searches may be customized based on the one or more aspects of the user. For example, different types of users may have different search options available. Moreover, users may be able to save searches to provide quick access to the search in the future. The user may also have access to one or more predefined searches, and these searches may also be customized based on the user. For example, search area 520 may include a link that takes a user to a list of all computer changes with which the user is involved.

Computer change information area 530 facilitates user review of one or more computer changes. As illustrated in FIG. 3, computer change information area 530 includes a list of search results, including for each computer change a program name, a lead assessor, a key contact, one or more assessment rules and their corresponding scores, and a button that facilitates viewing additional information about the computer change. Other embodiments may include all, some, or none of this information, and they may include additional information and utilize difference layouts. Some embodiments may utilize a "heat map" to indicate the status of each assessment rule 112. For example, assessment rules 112 that have a passing score may be highlighted in green, while assessment rules 112 that have a failing score may be highlighted in red.

Similar GUIs 500 may also be used to facilitate other aspects of monitoring and administering one or more computer changes. Furthermore, various GUIs may have some, all, or none of the components shown in FIG. 3. Various GUIs may also have additional components. For example, some embodiments of GUI 500 may have different numbers and types of buttons in navigational tools area 510 and search area 520, may present different pieces of information in computer change information area 530, and may have different layouts of the various components. Additional GUIs may facilitate notification of permits, notification of permit rejections, and review of errors associated with computer changes. For example, a GUI may be utilized to facilitate review of errors and associated assessment rules and/or accountable entities after a computer change goes into production following the issuance of an operate permit. Furthermore, certain GUIs may provide different views and/or different information depending on which user is interacting with the GUI. For example, a software developer may be presented with a view showing only his computer change, a program manager may be presented with information related to all computer changes within his purview, and a higher level officer may be able to review all computer changes within an organization. Furthermore, different individuals or groups of individuals may have different review options. For example, a software developer may be able view the compliance scores for his project, while higher level individuals may be able to both view and edit compliance scores.

The evaluation of standards compliance by permit module 100 and subsequent presentation of GUI 500 to facilitate user review of computer changes may provide a more uniform, efficient, and reliable method of enforcing standards compliance during software development. For example, GUIs 500 may provide a single set of interfaces for facilitating review of multiple types of computer changes. This integrated framework may provide a more cost-effective mechanism for enforcing standards compliance during software development since multiple projects can be reviewed and evaluated through a single tool. Furthermore, the integration and association of design, build, and operating information within a single tool may also facilitate improved end-to-end governance and collaboration between different stakeholders.

Certain embodiments of the invention may provide one or more technical advantages. A technical advantage of one embodiment may allow for more effective enforcement of design standards and/or build standards during the software development process. Certain embodiments may also provide a more efficient and cost-effective mechanism for ensuring that standards are met before building and/or operation of the computer change begins. Some embodiments may improve the efficiency of software development and improve the speed-to-market, stability, and overall quality of computer changes. Furthermore, certain embodiments may improve end-to-end program governance and accountability by providing a framework for associating design, build, or operational errors with particular assessment rules and/or particular individuals or organizations. Certain embodiments may also improve communication and collaboration during the development of computer changes. Some embodiments may also improve the user experience when assessing computer changes by storing and managing relationships between a computer change and its associated programs, projects, applications, responsible parties, or other entities. Certain embodiments may also provide improved searchability and visibility by incorporating these relationships into searches and navigation options. Some embodiments may provide improved assessment procedures by enabling more streamlined and user-friendly creation of compliance assessment rulesets that may be used to assess a computer change. Some embodiments may improve assessment efficiency by leveraging general assessment rulesets that may be dynamically tailored to particular computer changes.

Herein, "or" is inclusive and not exclusive, unless expressly indicated otherwise or indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, "A and B" means "A and B, jointly or severally," unless expressly indicated otherwise or indicated otherwise by context.

Particular embodiments may be implemented as hardware, software, or a combination of hardware and software. As an example and not by way of limitation, one or more computer systems may execute particular logic or software to perform one or more steps of one or more processes described or illustrated herein. Software implementing particular embodiments may be written in any suitable programming language (which may be procedural or object oriented) or combination of programming languages, where appropriate. In various embodiments, software may be stored in computer-readable storage media. Any suitable type of computer system (such as a single- or multiple-processor computer system) or systems may execute software implementing particular embodiments, where appropriate. A general-purpose computer system may execute software implementing particular embodiments, where appropriate. In certain embodiments, portions of logic may be transmitted and or received by a component during the implementation of one or more functions.

Herein, reference to a computer-readable storage medium encompasses one or more non-transitory, tangible, computer-readable storage medium possessing structures. As an example and not by way of limitation, a computer-readable storage medium may include a semiconductor-based or other integrated circuit (IC) (such as, for example, an FPGA or an application-specific IC (ASIC)), a hard disk, an HDD, a hybrid hard drive (HHD), an optical disc, an optical disc drive (ODD), a magneto-optical disc, a magneto-medium, a solid-state drive (SSD), a RAM-drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of interface 102, one or more portions of processor 104, one or more portions of memory 110, or a combination of these, where appropriate. Analogous portions of project module 200 and application 300 may also be configured in this manner. In particular embodiments, a computer-readable storage medium implements RAM or ROM. In particular embodiments, a computer-readable storage medium implements volatile or persistent memory.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, various embodiments may perform all, some, or none of the steps described above. Various embodiments may also perform the functions described in various orders.

Various embodiments disclosed herein may be used together in a variety of combinations. In various embodiments, permit module 100 may have different types, numbers, and configurations of interface 102, processor 104, memory 110, or any components thereof (analogous portions of project module 200 and application 300 may also be configured in this manner). For example, various embodiments may utilize different numbers and types of assessment rules 112.

Although the present invention has been described above in connection with several embodiments; changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. An apparatus for assessing standards compliance during computer development, comprising:
   an interface operable to receive a first selection from a user, the first selection comprising a design assessment ruleset to be used for evaluating a computer change, the design assessment ruleset comprising one or more design assessment rules, each design assessment rule associated with a condition that determines whether the design assessment rule is evaluated, the condition indicating whether the assessment rule is associated with one or more of a pilot project and a completed project;
   a memory operable to store the design assessment ruleset; and
   a processor communicatively coupled to the interface and the memory, the processor operable to:
      determine whether the computer change is associated with a pilot project;
      communicate to the user a design evaluation question relating to each design assessment rule whose associated condition indicates that the assessment rule is associated with a pilot project, an answer to the design evaluation question indicating an extent to which the computer change complies with the design assessment rule, the answer indicating one of compliance, noncompliance, or partial compliance; and
      determine one or more design scores based on the answer to each design evaluation question.

2. The apparatus of claim 1, wherein the processor is further operable to determine whether to permit building of the computer change based at least on the one or more design scores.

3. The apparatus of claim 1, wherein:
   the interface is further operable to:
      receive application information from an application module, the application information comprising:
         an application identifier uniquely identifying an application; and
         application relationship information indicating a relationship between the application and the computer change; and
      receive user input indicating that a user has chosen to view information associated with the application; and
   the processor is further operable to:
      cause information associated with the application to be displayed to the user in response to the user input.

4. The apparatus of claim 1, wherein:
   the interface is further operable to:
      receive project information from a project module, the project information comprising:
         a project identifier identifying a project; and
         project relationship information indicating a relationship between the project and the computer change; and
      receive user input indicating that a user has chosen to view information associated with the project; and
   the processor is further operable to:
      cause information associated with the project to be displayed to the user in response to the user input.

5. The apparatus of claim 1, wherein:
   the interface is further operable to receive a preliminary selection from the user, the first preliminary selection comprising the one or more design assessment rules;
   the processor is further operable to generate the design assessment ruleset based on the preliminary selection.

6. The apparatus of claim 1, wherein each conditional design assessment rule comprises a rule type, the rule type indicating an impact of the conditional design assessment rule's respective design score on the determination of whether to permit building of the computer change.

7. The apparatus of claim 1, wherein:
   the interface is further operable to receive a second selection from a user, the second selection comprising a build assessment ruleset to be used for evaluating a computer change, the build assessment ruleset comprising one or more build assessment rules, each build assessment rule associated with a condition that determines whether the build assessment rule is evaluated, the condition indicating whether the assessment rule is associated with one or more of a pilot project and a completed project;
   the memory is further operable to store the build assessment ruleset; and the processor is further operable to:
      determine whether the computer change is associated with a pilot project;
      communicate to the user a build evaluation question relating to each build assessment rule whose associated condition indicates that the assessment rule is associated with a pilot project, an answer to the build evaluation question indicating an extent to which the computer change complies with the build assessment rule;
      determine one or more build scores based on the answer to each build evaluation question; and
      determine whether to permit operation of the computer change based at least on the one or more build scores.

8. The apparatus of claim 7, wherein the processor is further operable to:
   identify, after the operation of the computer change is permitted, an error associated with the operation of the computer change; and
   associate the error with at least one of the following:
      a design assessment rule; and
      a build assessment rule.

9. A computer readable storage medium comprising logic, the logic operable, when executed by a processor, to:
   receive a first selection from a user, the first selection comprising a design assessment ruleset to be used for evaluating a computer change, the design assessment ruleset comprising one or more design assessment rules, each design assessment rule associated with a condition that determines whether the design assessment rule is evaluated, the condition indicating whether the assessment rule is associated with one or more of a pilot project and a completed project;

store the design assessment ruleset;

determine whether the computer change is associated with a pilot project;

communicate to the user a design evaluation question relating to each design assessment rule whose associated condition indicates that the assessment rule is associated with a pilot project, an answer to the design evaluation question indicating an extent to which the computer change complies with the design assessment rule, the answer indicating one of compliance, noncompliance, or partial compliance; and determine one or more design scores based on the answer to each design evaluation question.

10. The computer readable storage medium of claim 9, wherein the logic is further operable, when executed by the processor, to determine whether to permit building of the computer change based at least on the one or more design scores.

11. The computer readable storage medium of claim 9, wherein the logic is further operable, when executed by the processor, to:

receive application information from an application module, the application information comprising:
an application identifier uniquely identifying an application; and
application relationship information indicating a relationship between the application and the computer change;

receive user input indicating that a user has chosen to view information associated with the application; and cause information associated with the application to be displayed to the user in response to the user input.

12. The computer readable storage medium of claim 9, wherein the logic is further operable, when executed by the processor, to:

receive project information from a project module, the project information comprising:
a project identifier identifying a project; and
project relationship information indicating a relationship between the project and the computer change;

receive user input indicating that a user has chosen to view information associated with the project; and cause information associated with the project to be displayed to the user in response to the user input.

13. The computer readable storage medium of claim 9, wherein the logic is further operable, when executed by the processor, to:

receive a preliminary selection from the user, the preliminary selection comprising the one or more design assessment rules; and generate the design assessment ruleset based on the preliminary selection.

14. The computer readable storage medium of claim 9, wherein each conditional design assessment rule comprises a rule type, the rule type indicating an impact of the conditional design assessment rule's respective design score on the determination of whether to permit building of the computer change.

15. The computer readable storage medium of claim 9, wherein the logic is further operable, when executed by the processor, to:

receive a second selection from a user, the second selection comprising a build assessment ruleset to be used for evaluating a computer change, the build assessment ruleset comprising one or more build assessment rules, each build assessment rule associated with a condition that determines whether the build assessment rule is evaluated, the condition indicating whether the assessment rule is associated with one or more of a pilot project and a completed project;

store the build assessment ruleset;

determine whether the computer change is associated with a pilot project;

communicate to the user a build evaluation question relating to each build assessment rule whose associated condition indicates that the assessment rule is associated with a pilot project, an answer to the build evaluation question indicating an extent to which the computer change complies with the build assessment rule;

determine one or more build scores based on the answer to each build evaluation question; and determine whether to permit operation of the computer change based at least on the one or more build scores.

16. The computer readable storage medium of claim 15, wherein the logic is further operable, when executed by the processor, to:

identify, after the operation of the computer change is permitted, an error associated with the operation of the computer change; and associate the error with at least one of the following:
a design assessment rule; and
a build assessment rule.

17. A method for evaluating standards compliance during software development, comprising:

receiving, by an interface, a first selection from a user, the first selection comprising a design assessment ruleset to be used for evaluating a computer change, the design assessment ruleset comprising one or more design assessment rules, each design assessment rule associated with a condition that determines whether the design assessment rule is evaluated, the condition indicating whether the assessment rule is associated with one or more of a pilot project and a completed project;

storing, by a memory, the design assessment ruleset;

determining whether the computer change is associated with a pilot project;

communicating to the user, by the processor, a design evaluation question relating to each design assessment rule whose associated condition indicates that the assessment rule is associated with a pilot project, an answer to the design evaluation question indicating an extent to which the computer change complies with the design assessment rule, the answer indicating one of compliance, noncompliance, or partial compliance; and determining, by the processor, one or more design scores based on the answer to each design evaluation question.

18. The method of claim 17, further comprising determining, by the processor, whether to permit building of the computer change based at least on the one or more design scores.

19. The method of claim 17, further comprising:

receiving, by the interface, a preliminary selection from the user, preliminary selection comprising the one or more design assessment rules; and generating, by the processor, the design assessment ruleset based on the preliminary selection.

20. The method of claim 19, further comprising:

receiving, by the interface, a second selection from a user, the second selection comprising a build assessment ruleset to be used for evaluating a computer change, the build assessment ruleset comprising one or more build assessment rules, each build assessment rule associated with a condition that determines whether the build assessment rule is evaluated, the condition indicating whether the assessment rule is associated with one or more of a pilot project and a completed project;

storing, by the memory, the build assessment ruleset;

determining whether the computer change is associated with a pilot project;

communicating to the user, by the processor, a build evaluation question relating to each build assessment rule whose associated condition indicates that the assessment rule is associated with a pilot project, an answer to the build evaluation question indicating an extent to which the computer change complies with the build assessment rule;

determining, by the processor, one or more build scores based on the answer to each build evaluation question; and determining, by the processor, whether to permit building of the computer change based at least on the one or more build scores.

* * * * *